United States Patent [19]

Sotack et al.

[11] Patent Number: 5,465,619
[45] Date of Patent: Nov. 14, 1995

[54] CAPACITIVE SENSOR

[75] Inventors: John D. Sotack, Rochester; William L. Dezen, Penfield; Lawrence R. Benedict, Rushville; Gaith O. Zayed; Alan J. Werner, Jr., both of Rochester, all of N.Y.

[73] Assignee: Xerox Corporation, Stamford, Conn.

[21] Appl. No.: 289,981

[22] Filed: Aug. 12, 1994

Related U.S. Application Data

[63] Continuation of Ser. No. 118,077, Sep. 8, 1993, abandoned.

[51] Int. Cl.⁶ ................................................. G01F 23/26
[52] U.S. Cl. ...................... 73/304 C; 118/694; 324/662; 324/664; 324/671; 355/245; 355/298
[58] Field of Search ........................ 73/290 R, 304 C; 324/662, 671, 664; 118/694; 355/256, 245, 298

[56] References Cited

U.S. PATENT DOCUMENTS

| | | | |
|---|---|---|---|
| 3,301,056 | 1/1967 | Blanchard et al. | 73/304 C |
| 3,498,500 | 3/1970 | Hansen | 222/23 |
| 3,520,445 | 7/1970 | Hansen | 222/23 |
| 3,533,286 | 10/1970 | Westcott et al. | 73/304 C |
| 3,706,980 | 12/1972 | Maltby | 73/304 C |
| 3,774,238 | 11/1973 | Hardway, Jr. | 73/304 C |
| 3,801,902 | 4/1974 | Horowitz | 73/304 C |
| 3,935,739 | 2/1976 | Ells | 73/304 C |
| 4,099,167 | 7/1978 | Pomerantz et al. | 73/304 C |
| 4,133,453 | 1/1979 | Ohbora | 73/304 C |
| 4,313,343 | 2/1981 | Kobayashi et al. | 73/290 V |
| 4,423,628 | 1/1984 | Richter | 73/304 C |
| 4,603,581 | 8/1986 | Yamanoue et al. | 73/304 C |
| 4,624,139 | 11/1986 | Collins | 73/304 C |
| 4,711,561 | 12/1987 | Tsuruoka | 118/652 |
| 4,749,988 | 6/1988 | Berman et al. | 73/290 R |
| 4,757,252 | 7/1988 | Maltby et al. | 73/304 C |
| 4,820,973 | 4/1989 | Alvarez | 73/304 C |
| 4,868,599 | 9/1989 | Niki | 355/260 |
| 4,987,776 | 1/1991 | Koon | 73/290 R |
| 5,017,909 | 5/1991 | Goekler | 73/304 C |
| 5,121,631 | 6/1992 | Koon | 73/290 R |
| 5,132,626 | 7/1992 | Limuti et al. | 73/304 C |
| 5,195,010 | 3/1993 | Dresner | 361/56 |
| 5,198,860 | 3/1993 | Yamanaka et al. | 355/246 |

FOREIGN PATENT DOCUMENTS

| | | | |
|---|---|---|---|
| 2592713 | 7/1987 | France | 73/304 C |
| 361223618 | 10/1986 | Japan | 73/304 C |
| 0150726 | 6/1990 | Japan | 73/304 C |
| 7503179 | 9/1976 | Netherlands | 73/304 C |

OTHER PUBLICATIONS

Research Disclosure Bulletin; "Toner Level Detector"; RDB8221306; p. 482; Jan. 1982; Anonymous.

*Primary Examiner*—Diego F. F. Gutierrez
*Attorney, Agent, or Firm*—John S. Wagley

[57] ABSTRACT

An apparatus for detecting the level of material in a container. The apparatus comprises a power source and a first electrode, positioned adjacent the container, electrically connected to the power source. The apparatus further comprises a second electrode. The second electrode is spaced from the first electrode and positioned adjacent the container. The apparatus further comprises an electrical amplifier which is electrically connected to the second electrode. The amplifier amplifies a current induced in the second electrode and generates a voltage signal. The amplifier is adapted to maintain the second electrode at a virtual ground to minimize environmental impedance effects. The apparatus further comprises a rectifier, electrically connected to the amplifier, for rectifying the voltage signal and a comparator, electrically connected to the rectifier, for comparing the voltage signal to a predetermined voltage signal corresponding to the container being full with material.

17 Claims, 12 Drawing Sheets

CAPACITIVE SENSOR

This is a continuation of application Ser. No. 08/118,077, filed Sep. 8, 1993, now abandoned.

The present invention relates to a method and apparatus for determining toner levels in an electrophotographic printing machine. More specifically, the invention relates to a sensor for measuring waste toner levels.

The features of the present invention are useful in the printing arts and more particularly in electrophotographic printing. In the process of electrophotographic printing, a photoconductive surface is charged to a substantially uniform potential. The photoconductive surface is image wise exposed to record an electrostatic latent image corresponding to the informational areas of an original document being reproduced. This records an electrostatic latent image on the photoconductive surface corresponding to the informational areas contained within the original document. Thereafter, a developer material is transported into contact with the electrostatic latent image in a region known as the development zone. Toner particles are attracted from beads of the developer material onto the latent image. The resultant toner powder image is then transferred from the photoconductive surface to a copy sheet and permanently affixed thereto. The foregoing generally describes a typical mono-color electrophotographic copying machine.

After the developer material has been transferred to a copy sheet a residue of paper fragments, developer material and other contaminants remain on the photoconductive surface and this residue must be removed from the photoconductive surface prior to the next charging of the photoconductive surface. A cleaning station is provided within the machine to remove the residue from the photoconductive surface. The cleaning station includes a container or vessel which stores the residue for periodic disposal.

The following disclosures may be relevant to various aspects of the present invention:

RDB82 21306 Research Disclosure Bulletin Page 482, No. 21306 Toner Level Detector Date: January, 1982
U.S. Pat. No. 3,301,056 Patentee: Blanchard et al. Issue Date: Jan. 31, 1967
U.S. Pat. No. 3,498,500 Patentee: Hansen Issue Date: Mar. 3, 1970
U.S. Pat. No. 3,520,445 Patentee: Hansen Issue Date: Jul. 14, 1970
U.S. Pat. No. 3,533,286 Patentee: Westcott et al. Issue Date: Oct. 13, 1970
U.S. Pat. No. 3,706,980 Patentee: Maltby Issue Date: Dec. 19, 1972
U.S. Pat. No. 4,133,453 Patentee: Ohbora Issue Date: Jan. 9, 1979
U.S. Pat. No. 4,313,343 Patentee: Kobayashi et al. Issue Date: Feb. 2, 1982
U.S. Pat. No. 4,711,561 Patentee: Tsuruoka Issue Date: Dec. 8, 1987
U.S. Pat. No. 4,868,599 Patentee: Niki Issue Date: Sep. 19, 1989
U.S. Pat. No. 5,198,860 Patentee: Yamanaka et al. Issue Date: Mar. 30, 1993

The Research Disclosure Bulletin discloses an apparatus for monitoring the level of toner inside a toner collection bottle of a copier. The permittivity of toner is different than that of air, so that the capacitance of two conductive electrodes is a function of the level of toner between them. The apparatus includes a pair of oppositely disposed electrodes which engage a toner collection bottle. One electrode is connected to the output of a sine wave generator. A receiving amplifier includes an R–C differentiator amplifier which maximizes the change in the voltage. The voltage is a function of the level of toner between the electrodes. The receiving amplifier has a high input impedance to reduce the loading effect. Since the change in capacitance is relatively small, rigid wiring and shielding, as well as mounting the whole circuit close to the electrodes, are very desirable. The output of the receiving amplifier is amplified, if necessary, and is sent to a band pass filter and finally to an AC to DC converter. The output voltage of the AC to DC converter is directly proportional to the level of the toner between the electrodes.

U.S. Pat. No. 3,301,056 discloses a digital system for measuring the level, volume or mass of a fluid at a remote point. The system utilizes a capacitive sensor wherein the fluid of interest is the dielectric medium between the sensor electrodes. Variation in the fluid condition is reflected in the capacitance of the sensor. The capacitance of the sensor, in turn, is determined by the use of digital techniques.

U.S. Pat. No. 3,498,500 discloses a level sensing controller for determining the quantity of xerographic toner powder in a toner powder dispenser of an automatic xerographic reproducing machine wherein an electro-audio transducer emits an acoustical signal to be received by an audio-electro transducer generating an electric signal coupled to a threshold detecting circuit for activating a suitable indicator when the quantity of toner powder contained within the dispensing cavity is below a level predetermined for optimum machine operation.

U.S. Pat. No. 3,520,445 discloses a level sensing controller for determining the quantity of xerographic toner powder in a toner powder dispenser of a xerographic reproducing machine wherein a plurality of electrically conductive plates are suspended within the dispenser cavity in spaced relation and connected to a threshold detecting circuit for activating a suitable indicator when the quantity of toner powder contained within the dispensing cavity is below a level predetermined for optimum machine operation.

U.S. Pat. No. 3,533,286 discloses a tank quantity gage which uses a sensing capacitor driven from an AC source to measure the quantity of liquid in a reservoir such as a fuel or oil tank. A reference capacitor, driven from the same source as the sensing capacitor, is connected to vary the amplitude or frequency of the source voltage in accordance with the current through the reference capacitor so as to compensate for changes in the dielectric constant of the liquid caused by variations in temperature, composition of the liquid, etc.

U.S. Pat. No. 3,706,980 discloses an RF system which measures the level of materials. The probe includes a measuring electrode and a guard shield. The guard shield is interposed between the electrode and a conductive member, commonly the container for the material, throughout the body of the probe. The variable capacitance between the measuring electrode and the conductive member is a measurement of the level of the material.

U.S. Pat. No. 4,133,453 discloses a toner residual amount detecting device for detecting a residual amount of toner in a toner hopper. The device comprises a capacitor section constructed of at least two electroconductive plates oppositely arranged in a toner filled hopper, and an electric circuit portion adapted to detect a capacitance between the electroconductive plates which is varied according to the amount of residual toner in the toner hopper.

U.S. Pat. No. 4,313,343 discloses a toner residual amount detecting device for detecting a residual amount of toner in a toner hopper. The apparatus includes a transmitting element in the hopper for generating an ultrasonic acoustic wave and a receiving element in the hopper in operative relation to the transmitting element for receiving the ultrasonic acoustic wave reflected from toner in the hopper, the magnitude of the reflected wave being representative of the level of toner in the toner hopper.

U.S. Pat. No. 4,711,561 discloses a toner full sensor for a toner recovery box into which residual toner is scraped from the latent image. The box has a window comprising a transparent or translucent housing projecting upwardly through the recovery box. The recovery device includes an optical sensor having light emitting and receiving elements arranged across the projected housing, a flat float member vertically movable on the top of the toner in the box, and a light shielding flag erected on the float. Thee light shield blocks the light path of the optical sensor providing a toner full signal.

U.S. Pat. No. 4,868,599 discloses a toner full sensor for a toner recovery box into which residual toner is scraped from the latent image. The recovered toner is compressed within a container by a resilient cantilever member. A diaphragm located within the container expands based on the pressure of the residual toner. Upon traveling a predetermined distance, the diaphragm forces a switch to close indicating the container is full.

U.S. Pat. No. 5,198,860 discloses a toner sensor for a developing unit of an image forming machine. A first lead wire transmits a detection signal indicating the amount of toner remaining in the developer. The first wire is connected in parallel to a second lead wire of a circuit that compares the signal to a reference voltage thereby determining the amount of toner remaining in the developer.

BRIEF SUMMARY OF THE INVENTION

In accordance with one aspect of the present invention, there is provided an apparatus for detecting the level of material in a container. The apparatus comprises a power source and a first electrode, positioned adjacent the container, electrically connected to the power source. The apparatus further comprises a second electrode. The second electrode is spaced from the first electrode and positioned adjacent the container. The apparatus further comprises an electrical amplifier which is electrically connected to the second electrode. The amplifier amplifies a current induced in the second electrode and generates a voltage signal. The amplifier is adapted to maintain the second electrode at a virtual ground to minimize environmental impedance effects. The apparatus further comprises a rectifier, electrically connected to the amplifier, for rectifying the voltage signal and a comparator, electrically connected to the rectifier, for comparing the voltage signal to a predetermined voltage signal corresponding to the container being full with material.

In accordance with another aspect of the present invention, there is provided an electrographic printing machine of the type having an apparatus for detecting the level of material in a container. The machine comprises a power source and a first electrode, positioned adjacent the container, electrically connected to the power source. The apparatus further comprises a second electrode. The second electrode is spaced from the first electrode and positioned adjacent the container. The apparatus further comprises an electrical amplifier which is electrically connected to the second electrode. The amplifier amplifies a current induced in the second electrode and generates a voltage signal. The amplifier is adapted to maintain the second electrode at a virtual ground to minimize environmental impedance effects. The apparatus further comprises a rectifier, electrically connected to the amplifier, for rectifying the voltage signal and a comparator, electrically connected to the rectifier, for comparing the voltage signal to a predetermined voltage signal corresponding to the container being full with material.

In accordance with another aspect of the present invention, there is provided a container of the type having an apparatus for detecting the level of material in the container and adapted to be connected to a power source. The apparatus comprises a first electrode and a second electrode. The second electrode is spaced from the first electrode and positioned adjacent the container. The apparatus further comprises an electrical amplifier which is electrically connected to the second electrode. The amplifier amplifies a current induced in the second electrode and generates a voltage signal. The amplifier is adapted to maintain the second electrode at a virtual ground to minimize environmental impedance effects. The apparatus further comprises a rectifier, electrically connected to the amplifier, for rectifying the voltage signal and a comparator, electrically connected to the rectifier, for comparing the voltage signal to a predetermined voltage signal corresponding to the container being full with material.

The invention will be described in detail herein with reference to the following figures in which like reference numerals denote like elements and wherein:

DETAILED DESCRIPTION OF THE INVENTION

Figure 11:
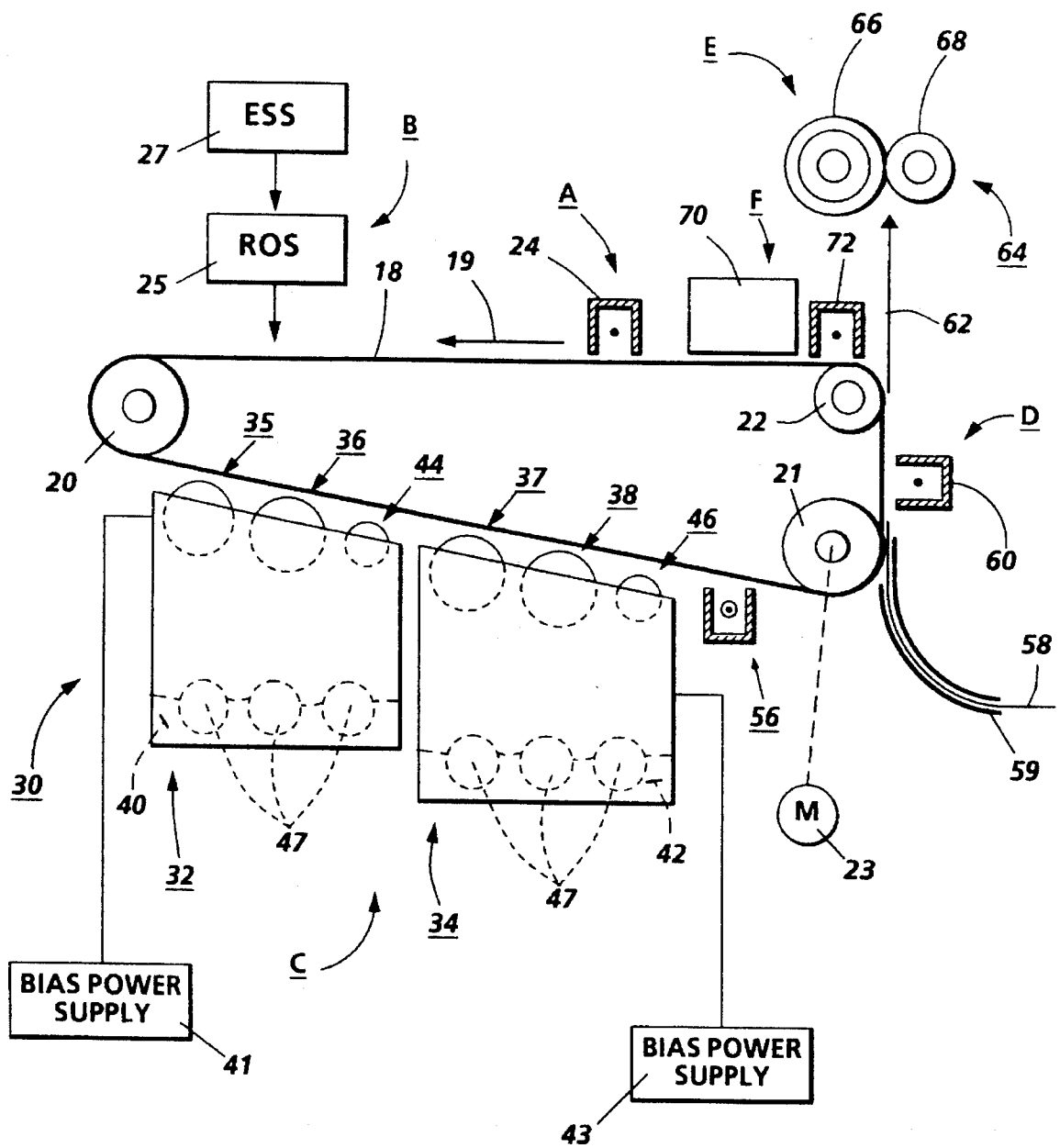
FIG. 11 is a schematic elevational view of portions of an illustrative electrophotographic printing machine incorporating the capacitive sensor of the present invention therein.

For a general understanding of the illustrative electrophotographic printing machine incorporating the features of the present invention therein, reference is made to the drawings. In the drawings, like reference numerals have been used throughout to designate identical elements. FIG. 11 schematically depicts the various components of an electrophotographic printing machine incorporating the toner sensor of the present invention therein. Although the toner sensor of the present invention is particularly well adapted for use in the illustrative printing machine, it will become evident that these toner sensors are equally well suited for use in a wide variety of printing machines and are not necessarily limited in their application to the particular embodiments shown herein.

Referring now to FIG. 11, the electrophotographic printing machine employs a belt 18, i.e., a charge retentive member, having a photoconductive surface deposited on a conductive substrate. Belt 18 moves in the direction of arrow 19 to advance successive portions thereof sequentially through the various processing stations disposed about the path of movement thereof. Belt 18 is entrained about drive roller 21, tensioning roller 20 and stripping roller 22. Motor 23 rotates roller 21 to advance belt 18 in the direction of arrow 19. Roller 21 is coupled to motor 23 by suitable means such as a belt drive.

Initially successive portions of belt 18 pass through charging station A. At charging station A, a corona generating device, indicated generally by the reference numeral 24, charges the belt 18 to a selectively high uniform electrical potential, preferably negative. Any suitable control, well known in the art, may be employed for controlling the corona generating device 24.

Next, the charged portions of the photoconductive surface are advanced through exposure station B. At exposure station B, the uniformly charged photoconductive surface or charge retentive surface is exposed to a laser based raster output scanning device 25 which causes the charge retentive surface to be selectively discharged in accordance with the output from the scanning device 25. Preferably, the scanning device is a three level laser Raster Output Scanner (ROS). The output scanning device 25 is driven by an input signal from an electronic subsystem (ESS) 27, which would serve as the interface between the device 25 and an input signal generator (not shown). Thus, in this embodiment, the photoconductive surface, which is initially charged to a high charge potential, is discharged image wise in the background (white) image areas and to near zero or ground potential in the highlight (i.e. color other than black) color parts of the image.

At development station C, a magnetic brush development system, indicated generally by the reference numeral 30 advances developer materials into contact with the electrostatic latent images. The development system 30 comprises first and second developer units 32 and 34. Preferably, each magnetic brush developer units includes a pair of magnetic brush developer rollers mounted in a housing. Thus, developer unit 32 contains a pair of magnetic brush rollers 35, 36 with developer unit 34 containing a pair of magnetic brush rollers 37, 38. Each pair of rollers advances its respective developer material into contact with the latent image. Appropriate developer biasing is accomplished via first and second power supplies 41 and 43, respectively, electrically connected to respective developer units 32 and 34.

Color discrimination in the development of the electrostatic latent image is achieved by moving the latent image recorded on the photoconductive surface past two developer units 32 and 34 in a single pass with the magnetic brush rolls 35, 36, 37 and 38 electrically biased to voltages which are offset from the background voltage, the direction of offset depending on the polarity of toner in the housing. The first developer unit 32, in the direction of movement of belt 18 as indicated by arrow 19, develops the discharged image areas of the photoconductive surface. This developer unit contains, for example, red developer material 40 having triboelectric properties such that the red toner is driven to the discharged image areas of the latent image by the electrostatic field between the photoconductive surface and the electrically biased developer rolls, which are electrically connected to the first bias power supply 41. Conversely, the second developer unit 34, in the direction of movement of belt 18 as indicated by arrow 19, develops the highly charged image areas of the latent image. This developer unit contains black developer, for example, material 42 having a triboelectric charge such that the black toner is urged towards highly charged areas of the latent image by the electrostatic field existing between the photoconductive surface and the electrically biased developer rolls in the second developer unit which are connected to the second bias power supply 43. Further, the first and second developer units 32 and 34 have bead removal devices 44 and 46 disposed therein and augers 47 for mixing and charging the developer material. Because the composite image developed on the photoreceptor consists of both positive and negative toner, a negative pre-transfer corona generating device 56 is provided to condition the toner for effective transfer of a developed toner image to a substrate using positive corona discharge.

A sheet of support material 58 is moved into contact with the toner image at transfer station D. The sheet of support material is advanced to transfer station D by conventional sheet feeding apparatus, not shown. Preferably, the sheet feeding apparatus includes a feed roll contacting the uppermost sheet of a stack copy sheets. Feed rolls rotate so as to advance the uppermost sheet from stack into a chute which directs the advancing sheet of support material into contact with the photoconductive surface of belt 18 in a timed sequence so that the toner powder image developed thereon contacts the advancing sheet of support material at transfer station D.

Transfer station D includes a corona generating device 60 which sprays ions of a suitable polarity onto the backside of sheet 58. This attracts substantially simultaneously the black and non-black portions of the toner powder image from the belt 18 to sheet 58. After transfer, the sheet continues to move, in the direction of arrow 62, onto a conveyor (not shown) which advances the sheet to fusing station E.

Fusing station E includes a fuser assembly, indicated generally by the reference numeral 64, which permanently affixes the transferred powder image to sheet 58. Preferably, fuser assembly 64 comprises a heated fuser roller 66 and a pressure roller 68. Sheet 58 passes between fuser roller 66 and pressure roller 68 with the toner powder image contacting fuser roller 66. In this manner, the toner powder image is permanently affixed to sheet 58. After fusing, a chute, not shown, guides the advancing sheet 58 to a catch tray, also not shown, for subsequent removal from the printing machine by the operator. It will also be understood that other post-fusing operations can be included, for example, binding, inverting and returning the sheet for duplexing and the like.

After the sheet of support material is separated from the photoconductive surface of belt 18, the residual toner particles carried by image and the non-image areas on the photoconductive surface are charged to a suitable polarity and level by a preclean charging device 72 to enable removal therefrom. These particles are removed at cleaning station F. The vacuum assisted, electrostatic, fur brush cleaner unit 70 is disposed at the cleaner station F. The cleaner unit has two fur brush rolls that rotate at relatively high speeds which creates mechanical forces that tend to sweep the residual toner particles into an air stream (provided by a vacuum source), and then into a waste container. Subsequent to cleaning, a discharge lamp or corona generating device (not shown) dissipates any residual electrostatic charge remaining prior to the charging thereof for the next successive imaging cycle.

It is believed that the foregoing description is sufficient for purposes of the present application to illustrate the general operation of an electrophotographic printing machine incorporating the development apparatus of the present invention therein.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

As the speed of the copy/printing machine increases, the cleaning station F is burdened with an increasingly more difficult task of removing an increasingly higher volume of the residual toner particles. The cleaning station F preferably comprises a cyclonic vacuum system to create sufficient flow to effectually remove waste toner removed by the cleaner unit 70. The higher residual toner flow into the waste container makes it increasingly important to monitor the height of the toner in the waste container. Electrical or mechanical sensors are typically used to monitor the container toner height. An over filled container results in toner being catastrophically distributed throughout the machine and the machine will require a lengthy service call for cleaning. The turbulent nature of the cyclone vacuum system creates electrical and mechanical noise, as well as electrostatic discharges, ESDs, which can render mechanical or electrical toner height sensors ineffective.

Figure 1:
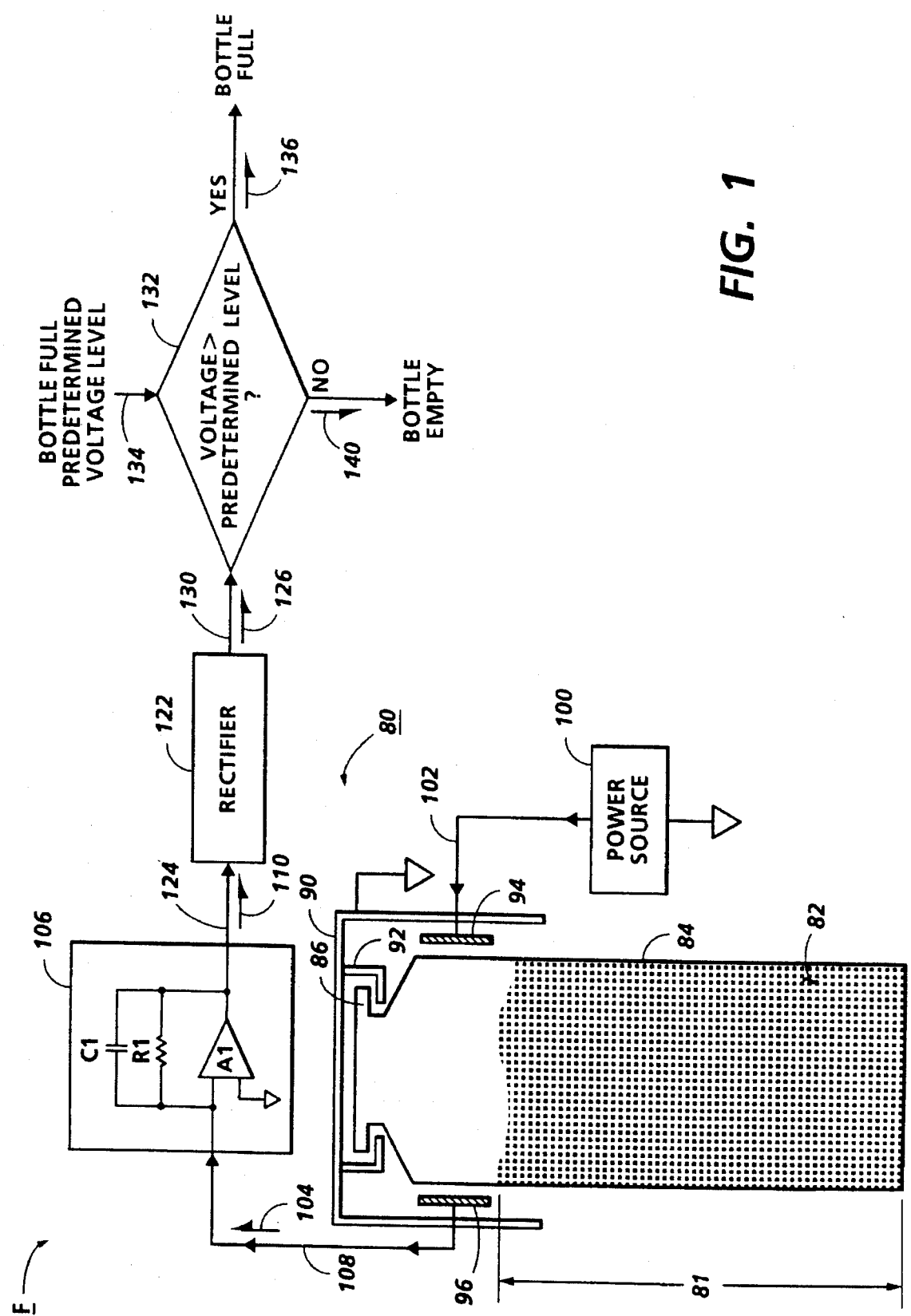
FIG. 1 is a partial schematic elevational view of an embodiment of the capacitive sensor of the present invention therein utilizing opposing sensors.

A capacitive toner sensor 80 incorporating the concepts of the present invention is shown generally in FIG. 1. The sensor 80 is used to measure a height 81 of waste developer material 82, such as toner, which has been collected in a waste container bottle 84. Since the permittivity of the toner 82 is greater than that of air, the difference between the permittivity of air and the toner 82 can be used to determine the height 81 of the toner 82 in the bottle 84.

In a xerographic machine, typically, the waste toner bottle is located in an upright position. For example, the bottle 84 may include an upper lip 86 from which the bottle 84 is suspended. A frame 90 of the cleaning system F includes brackets 92 to which the lip 86 of the bottle 84 slidingly fits.

The lip 86 and brackets 92 serve to orient the bottle 84 within the cleaning system F. A first electrode or signal electrode 94, as well as a second electrode or sense electrode 96 are located preferably outside the bottle 84 at a position where the height 81 of the toner 84 would correspond to the bottle 84 being full. Typically, the middle of the electrodes 94 and 96 are at approximately the height 81.

The signal electrode 94 is electrically connected to a power source 100, such as a voltage signal source, for example, an alternating current sine wave generator, by means of an electrical conduit 102. A signal 104 in the form of an induced current is sent from the signal electrode 94 to the sense electrode 96. If toner 82 is located between the signal electrode 94 and the sense electrode 96, the induced current 104 received at the sense electrode 96 will be greater than the induced current 104 if no toner 82 was located between the electrodes 94 and 96. The induced current 104 at the sense electrode 96 is transmitted to an electrical amplifier 106 by means of an electrical conduit 108 located between the sense electrode 96 and the electrical amplifier 106. The electrical amplifier 106 is specifically of low input impedance and is designed to keep the sense electrode 96 at a virtual ground or a nearly ground potential. A.C. output voltage 110 from the electrical amplifier 106 is proportional to the induced current 104.

The output voltage 110, which is preferably in sine wave form, is transmitted from the electrical amplifier 106 to rectifier 122 by way of electrical conduit 124. Rectifier 122 may take on any suitable form such as a full wave rectifier and converts a.c. output voltage 110 to a d.c. voltage 126. Preferably, the d.c. voltage 126 is a positive voltage. The d.c. voltage 126 is transmitted via conduit 130 to comparator 132. In the comparator 132, the d.c. voltage 126 is compared to a bottle full predetermined level d.c. voltage 134. The voltage 134 is that voltage which indicates that a bottle is full. If the d.c. voltage 126 is greater than the predetermined voltage 134, bottle full signal 136 is transmitted from the comparator 132 and if the d.c. voltage 126 is less than the predetermined voltage 134, a bottle not full signal 140 is sent from the comparator 132.

While the subject invention may be practiced utilizing the sensor 80 of FIG. 1 with signal electrode and sense electrode 94 and 96, respectively, being located diametrically opposite each other and the bottle 84 being located therebetween, other positions of the electrodes will fall within the scope of the invention. For example, the electrodes 94 and 96 may be located within the contents of the bottle 84 or the electrodes 148 and 146 may be located adjacent each other, as shown in the sensor 142 of FIG. 2.

Figure 2:
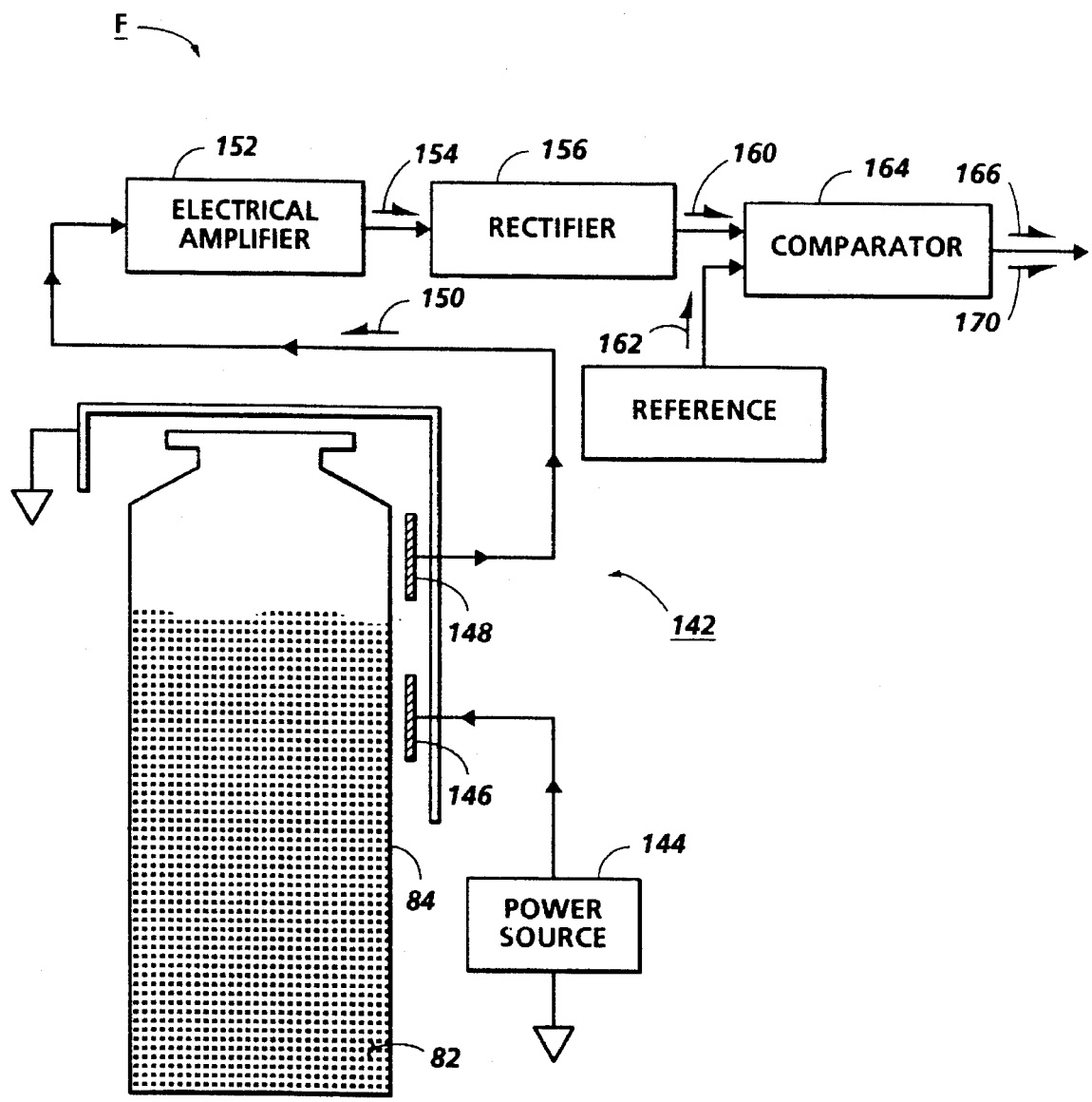
FIG. 2 is a partial schematic elevational view of another embodiment of the capacitive sensor of the present invention therein utilizing adjoining sensors.

Referring to FIG. 2, power source 144 is connected to signal electrode 146. Sense electrode 148 is located adjacent and spaced from signal electrode 146. Signal 150 in the form of induced current is transmitted from sense electrode 148 to electrical amplifier 152. Induced current 150 is amplified by the electrical amplifier 152 into amplified a.c. signal 154 which is transmitted to rectifier 156. The rectifier 156 converts the a.c. signal 154 into d.c. voltage signal 160. Preferably, the d.c. voltage signal 160 is a positive voltage. Voltage signal 160 is compared to reference voltage 162 by comparator 164. If d.c. voltage 160 exceeds reference voltage 162, a bottle full signal 166 is transmitted. If, on the other hand, reference voltage 162 exceeds d.c. voltage 160, a bottle not full signal 170 is transmitted from comparator 164.

The use of sensors 80 (FIG. 1) and 142 (FIG. 2) in electrophotographic printing machines may expose the sensors 80 and 142 to electrostatic discharges ESDs. These ESDs are an inherent part of the operation of electrophotographic copiers or printers, in that, the transfer of toner 82 onto the latent image is caused by an electrostatic charge. Therefore, an electrostatic charge is an inherent part of the machine, and the occasional electrostatic discharge within the machine is unavoidable. Electrostatic discharges are a particular concern where charged moving toner is involved, such as when a cyclonic cleaner is used to clean toner from the photoreceptor belt. The toner bottle accumulates ESDs along its periphery which may be transferred to the sensors 80 or 142. Electrostatic discharges may cause damage to sophisticated electronic components such as electrical amplifiers and may create an induced current composed mostly of the electrostatic discharge and, as such, may give a false bottle full signal.

Figure 3:
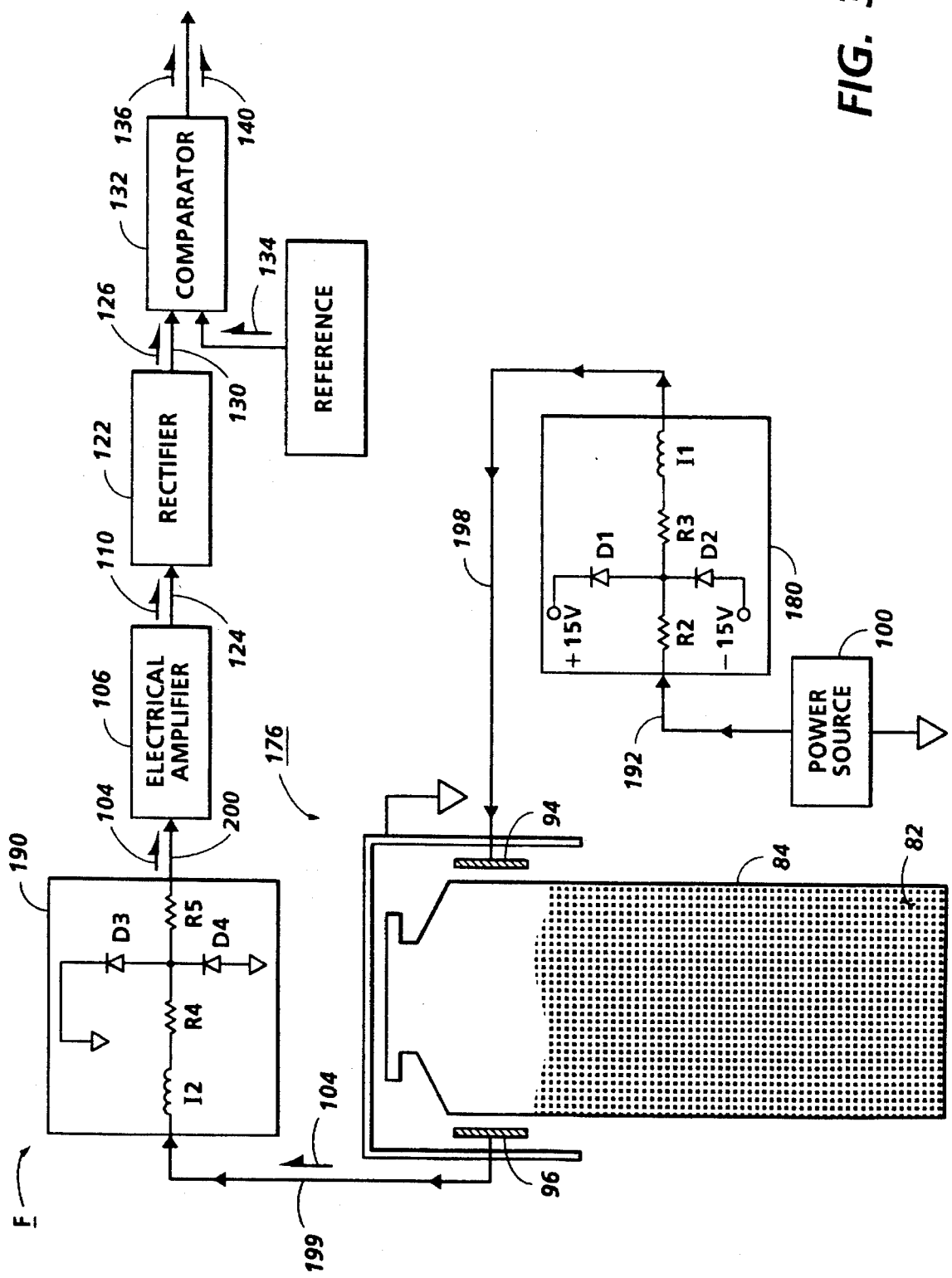
FIG. 3 is a partial schematic elevational view of the capacitive sensor of FIG. 1 utilizing circuit protection.

A sensor 176 designed to minimize the effect of electrostatic discharges is shown in FIG. 3. Sensor 176 is similar to sensor 80 except that sensor 176 also includes a power source protector 180 and an amplifier protector 190. It should be understood that the inclusion of either the power source protector 180 or the amplifier protector 190 may be sufficient to overcome the aforementioned problems with electrostatic discharges on sensors of the subject invention.

The power source protector 180 and the amplifier protector 190 may take on any suitable form whereby the electrostatic discharge may be absorbed within the protectors 180 and 190 and not permitted to progress to other components of the sensor 176. The power source protector 180 and the amplifier protector 190 may have similar or different configurations. Amplifier protector 190 primarily serves the purpose of protecting electrical amplifier 106 and avoiding spiked signals which would affect the effectiveness of comparator 132. Power source protector 180 primarily serves the purpose of protecting power source 100.

A suitable circuitry for power source protector 180 will now be described. A suitable amplifier protector 190 may utilize the circuitry identical to that of that described for power source protector 180. Power source 100 is electrically connected to power source protector 180 by means of conduit 192. Conduit 192 is electrically connected to resistor R2. Resistor R2 is electrically connected to first diode D1 and second diode D2. Diodes D1 and D2 are also connected to ground. The diodes D1 and D2 have two operating modes; a first low impedance mode when the voltage at the diodes is greater than a predetermined level of approximately +/–15 volts and a second high impedance mode when the voltage at the diodes is less than a predetermined level of approximately +/–15 volts. The diodes D1 and D2 limit the voltage going through the power source protector 180 to a low level such as approximately +/–15 volts. Likewise the diodes D1 and D2 absorb most of the current. The diodes D1 and D2 are further electrically connected to a second resistor R3. Resistor R3 serves to limit the current associated with electrostatic discharge spikes from electrode 94. Inductor I1 is electrically connected to resistor R3. Inductor I1 serves to spikes impede the flow of current from voltage spike caused by electrostatic discharges from electrode 94. Inductor I1 is electrically connected by means of conduit 198 to the signal electrode 94. As stated earlier, an exemplary circuit for the amplifier protector 190 may be identical to that of signal electrical protector 180.

Power from the power source 100 enter through the conduit 192 into the power source protector 180. The electrostatic discharges having a voltage greater than a predetermined level such as 0.60 volts are absorbed by the diodes D1 and D2. Power is then transferred through conduit 198 to the signal electrode 94. The induced current 104 is received by the sense electrode 96 and transmitted by way of conduit 199 to amplifier protector 190. Any significant electrostatic discharge current spike received at the amplifier protector 190 is absorbed by amplifier diodes D3 and D4. The induced current 104 from the sense electrode 96 is transferred through the amplifier protector 190 and is electrically transferred by conduit 200 to electrical amplifier 106. Electrical amplifier 106 transfers output signal 110 by means of electrical conduit 124 to rectifier 122. Rectifier 122 rectifies the output signal 110 and converts it into its average d.c. voltage 126 which is transferred by means of electrical conduit 130 to the comparator 132. When the comparator 132 transmits a high voltage signal 136 a bottle full condition is indicated and when the comparator 132 transmits a low voltage signal 140 a bottle not full condition is indicated.

As stated earlier, an overfilled container results in toner being catastrophically distributed through the machine and the machine will thereafter require a lengthy service call for cleaning. While sensors 80, 142, and 176, as described in FIGS. 1, 2 and 3, respectively, will signal a bottle full condition when the sensors are properly functioning, failure of electrical components within the sensors may lead to a situation where the bottle is overfilled. A signal of a bottle full condition in the event that the sensor were to fail would alleviate the resultant overfilled container and associated lengthy cleaning. The applicants anticipate that most electrical failures within the sensors result in no or a lower d.c. voltage signal 126 arriving at the comparator 132. Applicants have further discovered that a properly operating sensor with an empty waste toner bottle 84 emits a d.c. voltage 126 at the comparator 132 of a minimum voltage 203, for example, at least 1.5 volts d.c. Applicants have further discovered that an almost full toner bottle yields a d.c. voltage 126 at comparator 132 a maximum voltage 201, for example, of 2.7 volts d.c. In other words, applicants have discovered that to assure that the bottle 84 has room for additional toner 82, the d.c. voltage 126 coming from rectifier 122 should range between the minimum voltage 203 and the maximum voltage 201, for example, between 1.5 and 2.7 volts. Failsafe logic can, thus, be developed for the comparator 132 whereby a bottle empty condition is satisfied only when the voltage is between the voltages 203 and 201.

Figure 4:
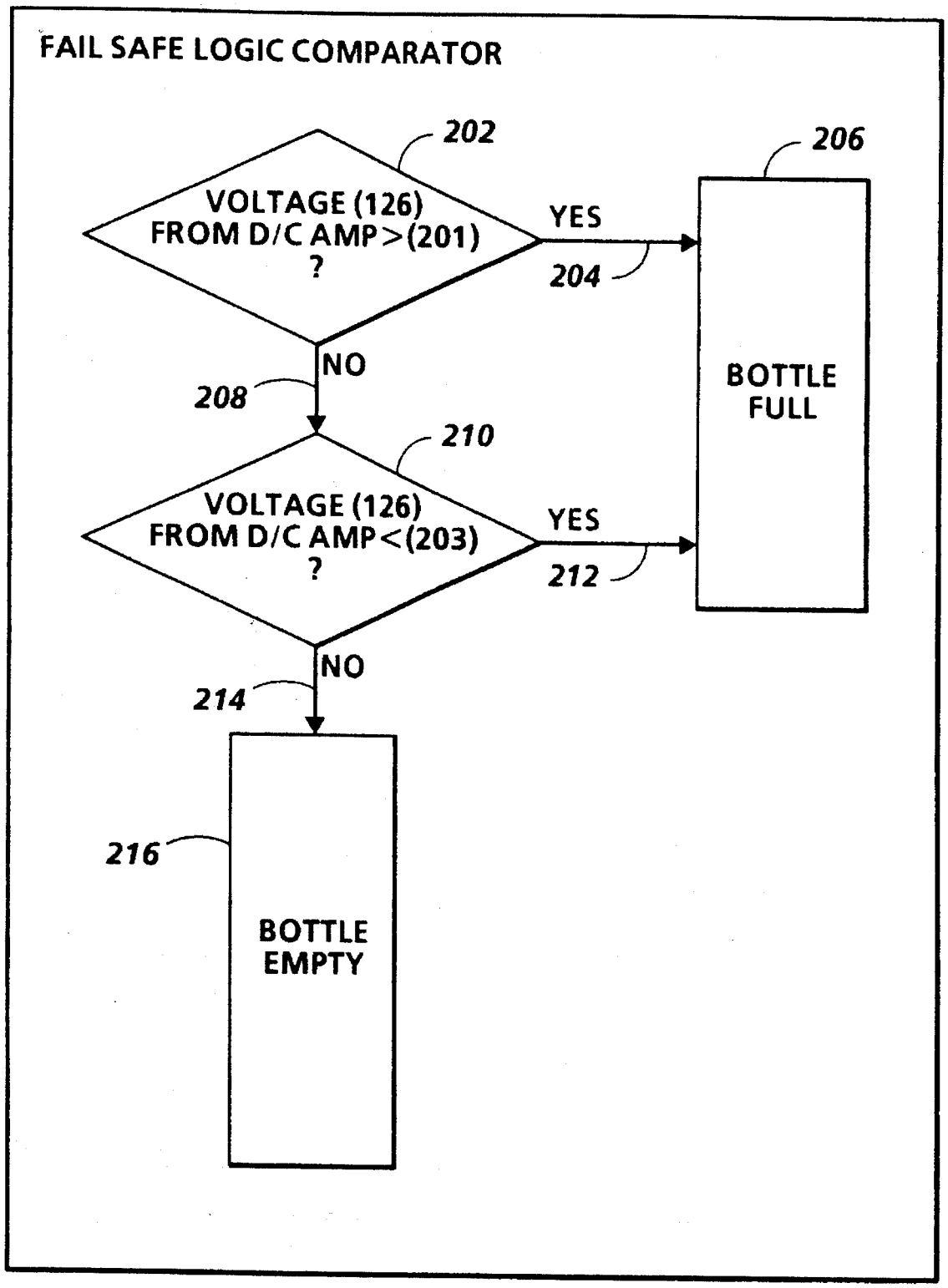
FIG. 4 is a flow diagram of fail safe logic for an embodiment of the capacitive sensor of the present invention therein.

An example of such failsafe logic is shown in FIG. 4. At block 202, d.c. voltage 126 is compared to the maximum voltage 201. If voltage 126 is greater than the maximum voltage 201, route 204 is taken and a bottle full block 206 is reached. If voltage 132 is less than and equal to the maximum voltage 201, route 208 is taken and block 210 is reached. At block 210, voltage 123 is compared to the minimum voltage 203. If voltage 132 is less than the minimum voltage 203, route 212 is taken and bottle full block 206 is reached. If voltage 132 is greater than or equal to the minimum voltage 203, route 214 is taken and block 216 bottle empty is reached. The failsafe logic as shown in FIG. 4 may be accomplished by any suitable electrical circuitry, one such circuitry shown in comparator 280 of FIG. 10.

Figure 5:
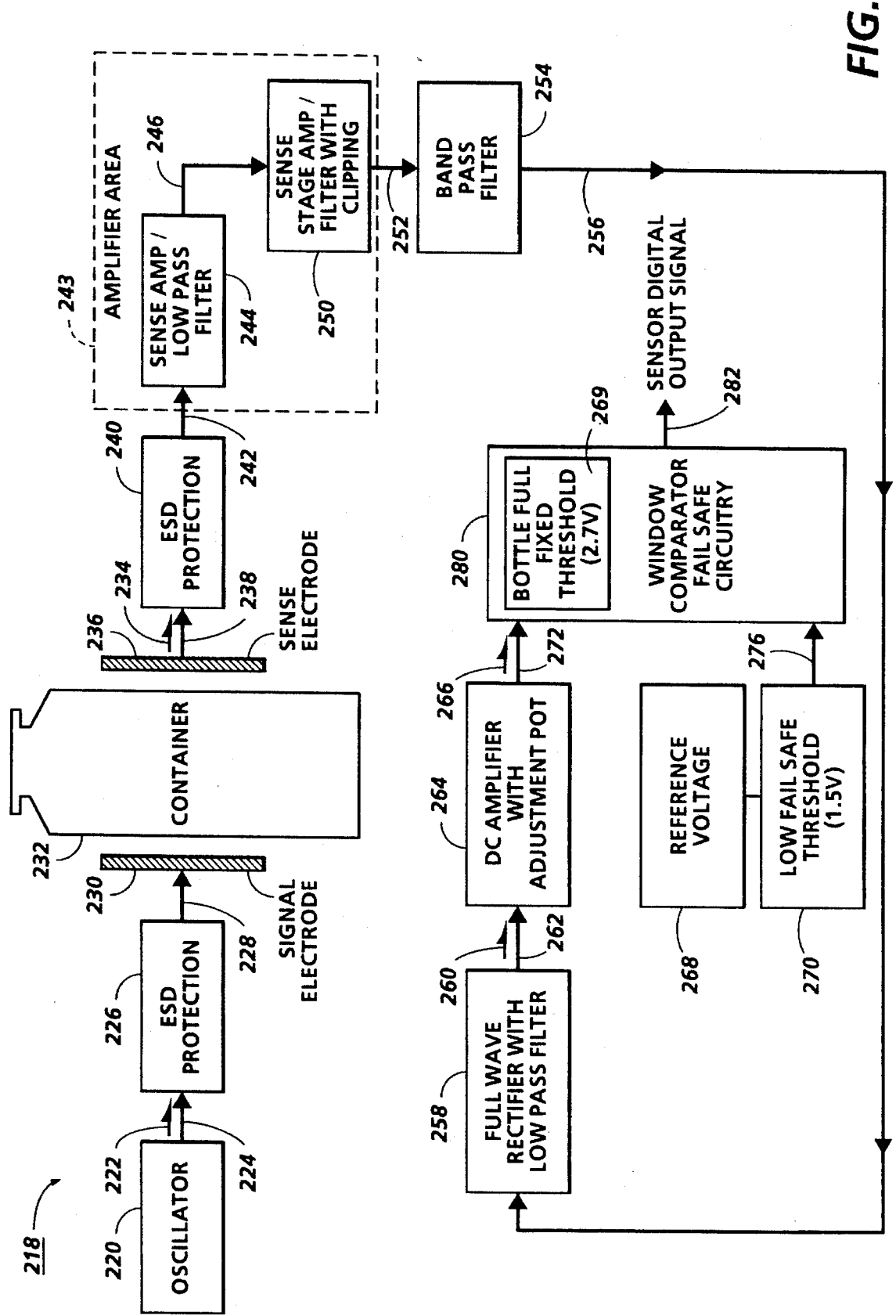
FIG. 5 is a partial schematic elevational view of another embodiment of the capacitive sensor of the present invention therein utilizing opposing sensors, circuit protection, and fail safe logic.

The induced current electrical amplifier 106 of FIG. 1, the circuit protectors 180 and 190 of FIG. 3, and the failsafe logic comparator of FIG. 4 may all be incorporated in a sensor 218 as shown in FIG. 5. Oscillator 220 sends out signals 222 to electrical conduit 224 to the ESD protection circuit 226. The ESD protection circuit 226 serves as a primary protection against damage to electrical components and reduces the effect of electrostatic discharge noise on the output. Signal 222 from the ESD protection 226 travels through conduit 228 to signal electrode 230. Waste bottle 232 is located adjacent the signal electrode 230. Signal 222 induces induced current 234 which is received at sense electrode 236. Induced current 234 then travels through electrical conduit 238 to ESD protection circuit 240. ESD protection circuit 240 protects the electrical components from electrostatic discharge at the sense electrode 236 and reduces the effect of electrostatic discharge noise on the output. Induced current 234 from the ESD protection circuit 240 travels through electrical conduit 242 to amplifier area 243.

Amplifier area 243 includes a first sense amplifier and low pass filter circuit 244. First amplifier circuit 244 is electrically connected by means of electrical conduit 246 to second stage amplifier filter with clipping circuit 250. The sense amp and low pass filter circuit 244 serves to maintain the sense electrode 236 at a low voltage approximating a virtual ground and thus define the voltage across the electrodes 230 and 236 to be the oscillating voltage. The virtual ground minimizes the capacitive coupling effects or impedance effects to the environment. The low pass filter portion of the sense amplifier circuit 244 filters out high frequency signals which are typically the result of system noise including electrostatic discharges.

The second stage amplifier and clipping circuit 250 filter provides additional gain. The second stage circuit 250 further filters out high frequency and low frequency noise. The clipping feature of the second stage circuit 250 further limits the output of the second stage circuit 250 to approximately one volt. Applicants have found that the voltage at conduit 246 is normally on the order of about 300 millivolts. Without the clipping feature, the output from the second stage amplifier 250 might spike as high as 15 volts. Frequent spikes could cause the output to rise. Further, the clipping feature maintains the output of the amplifier area 243 in a linear region which likely provides a faster recovery.

Signal 234 travels via electrical conduit 252 to band pass filter 254, whose peak response is preferably designed to be the frequency of the oscillator 220. The signal 234 from the band pass filter 254 travels via electrical conduit 256 to full wave rectifier with low pass filter 258. The band pass filter 254 provides more filtering at any desired gain. The filtering from filter 254 is needed because the full wave rectifier 258 tends to convert the amplitude of the strongest frequency component into a d.c. voltage. If a noise source had more amplitude than the signal at the conduit 256, the d.c. output at the rectifier 258 would tend to reflect the noise components amplitude. The rectifier with low pass filter 258 rectifies the incoming signal and passes low frequencies thereof. The output of the rectifier with filter 258 is essentially a d.c. voltage signal 260. The signal 260 is approximately equal to the average value of the input. D.C. voltage signal 260 from full wave rectifier 258 travels via conduit 262 to d.c. amplifier with adjustment potentiometer 264.

The d.c. amplifier 264 provides an adjustable d.c. gain so that the empty bottle output can be set to a predetermined level, for example, 2.15 volts independent of nominal component values. The d.c. amplifier 264 produces amplified d.c. voltage signal 266. Reference voltage circuit 268 provides bottle low failsafe threshold voltage 270 (approximately 1.5 volts). Amplified d.c. voltage signal 266 is sent via conduit 272 to comparator 280. Comparator 280 provides bottle full fixed threshold voltage 269 (approximately 2.7 volts). Low failsafe threshold voltage 270 is sent via conduit 276 to comparator 280. Sensor digital output signal 282 is generated by comparator 280. The comparator 280 controls the sensor output signal 282. The signal 282 is set high if the input signal is above the full threshold voltage 269 or below the low threshold voltage 270. During most situations where the circuit would be non-operational, such as disconnected harness, etc., the output would drop below the low threshold voltage 270 causing the sensor 218 to indicate a bottle full thus preventing the machine from running and overfilling the bottle. The failure modes covered by this circuit may include the loss of +15 volts, the loss of −15 volts, the loss of signal, the harness being disconnected, the failure of sensor circuit characterized by low input signal, and any failure causing input signal to drop below 1.5 volts. Utilizing the comparator 280 of a type having an open collector output and defining output signal 282 high when the signal 266 is below 1.5 volts, assures proper operation when the +15 volt signal is lost.

Figure 6A:
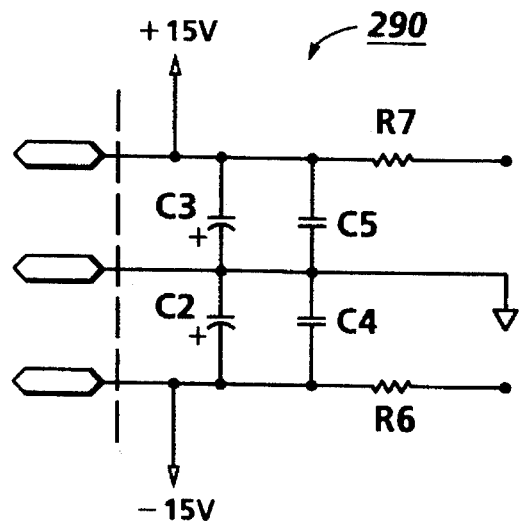
FIG. 6A is a circuit diagram of the power supply circuit for the capacitive sensor of FIG. 5.
Figure 6B:
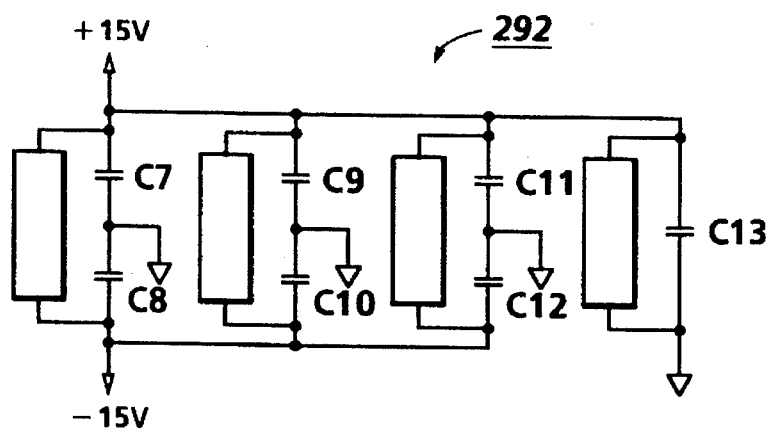
FIG. 6B is a circuit diagram of the power source conditioning circuit for the capacitive sensor of FIG. 5.
Figure 6C:
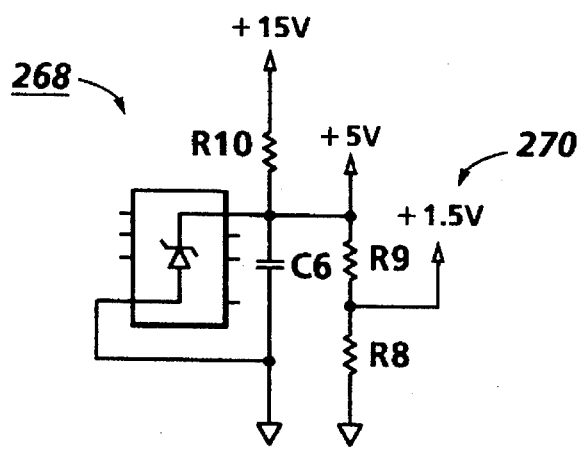
FIG. 6C is a circuit diagram of the reference voltage circuit for the capacitive sensor of FIG. 5.

To provide power supply line noise conditioning, the power supply for oscillator 220 may include power supply circuit 290 as shown in FIG. 6A. To provide stable supply voltage to circuit elements, the amplifiers used in the amplifier area 243, band pass filter 254, full wave rectifier 258, and d.c. amplifier 264, may utilize conditioning circuit 292 as shown in FIG. 6B. An embodiment of reference voltage circuit 268, utilized to provide reference voltages for comparator 280 is shown in FIG. 6C.

A table of exemplary circuit component values for reference voltage circuit 268, power supply conditioning circuit 290, and power source conditioning circuit 292 are as follows:

| ELEMENT NAME | ELEMENT NUMBER | ELEMENT VALUE |
| --- | --- | --- |
| CAPACITOR | C2 | 10.0 µf |
| CAPACITOR | C3 | 10.0 µf |
| CAPACITOR | C4 | 0.01 µf |
| CAPACITOR | C5 | 0.01 µf |
| CAPACITOR | C6 | 0.1 µf |
| CAPACITOR | C7 | 0.01 µf |
| CAPACITOR | C8 | 0.01 µf |
| CAPACITOR | C9 | 0.01 µf |
| CAPACITOR | C10 | 0.01 µf |
| CAPACITOR | C11 | 0.01 µf |
| CAPACITOR | C12 | 0.01 µf |
| CAPACITOR | C13 | 0.01 µf |
| RESISTOR | R6 | 10.0 |
| RESISTOR | R7 | 10.0 |
| RESISTOR | R8 | 1.62K |
| RESISTOR | R9 | 3.83K |
| RESISTOR | R10 | 1.0K |

Figure 7:
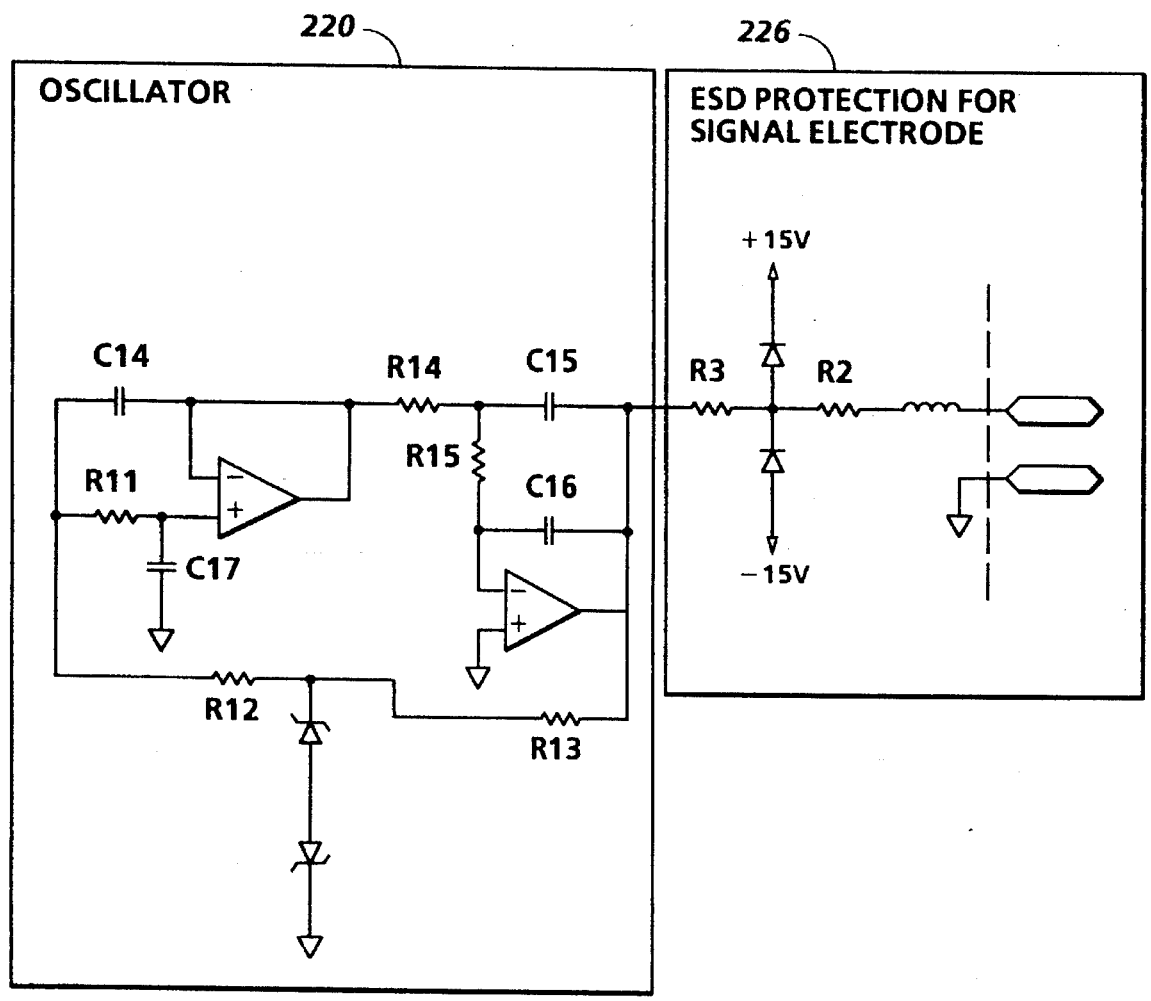
FIG. 7 is a circuit diagram of the oscillator and ESD protection for the signal electrode for the capacitive sensor of FIG. 5.

FIG. 7 shows exemplary circuitry for oscillator 222 and ESD protection circuit 226. A table of exemplary circuit component values for oscillator 222 and ESD protection circuit 226 are as follows:

| ELEMENT NAME | ELEMENT NUMBER | ELEMENT VALUE |
| --- | --- | --- |
| CAPACITOR | C14 | 220 Pf |
| CAPACITOR | C15 | 100 Pf |
| CAPACITOR | C16 | 12 Pf |
| CAPACITOR | C17 | 47 Pf |
| RESISTOR | R2 | 49.9K |
| RESISTOR | R3 | 49.9K |
| RESISTOR | R11 | 110K |
| RESISTOR | R12 | 221K |

-continued

| ELEMENT NAME | ELEMENT NUMBER | ELEMENT VALUE |
| --- | --- | --- |
| RESISTOR | R13 | 2.0K |
| RESISTOR | R14 | 100K |
| RESISTOR | R15 | 4.99K |

Figure 9:
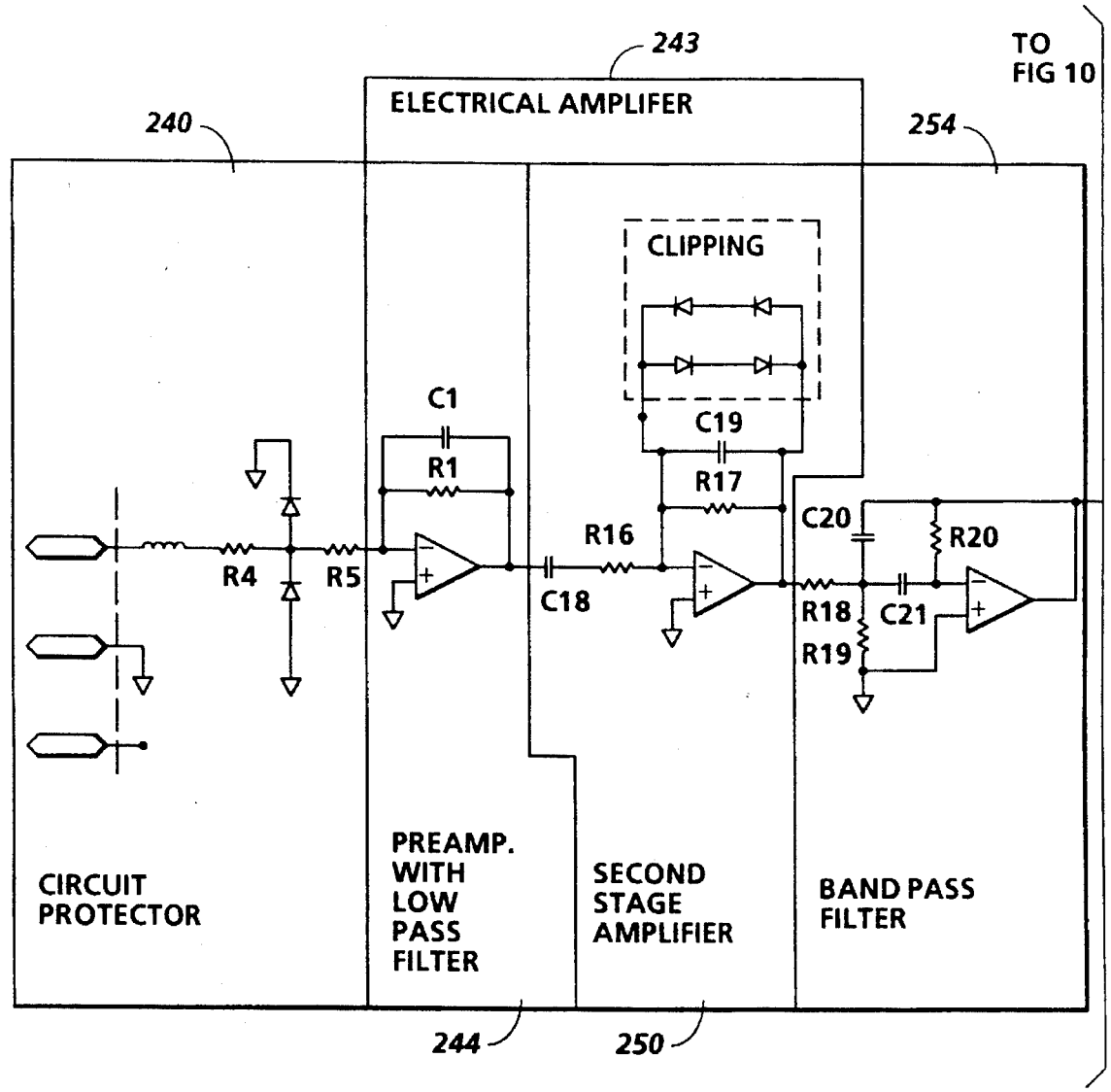
FIG. 9 is a circuit diagram of the ESD protection, AC amplifier and band pass filter for the sense electrode for the capacitive sensor of FIG. 5.

FIG. 9 illustrates exemplary circuitry for ESD protection circuit 240, electrical amplifier area 243, including sense amplifier 244 and second stage amplifier 250, and band pass filter 254. A table of exemplary circuit component values for ESD protection circuit 240, sense amplifier 244, second stage amplifier 250, and band pass filter 254 are as follows:

| ELEMENT NAME | ELEMENT NUMBER | ELEMENT VALUE |
| --- | --- | --- |
| CAPACITOR | C1 | 2 PF |
| CAPACITOR | C18 | 3300 PF |
| CAPACITOR | C19 | 220 PF |
| CAPACITOR | C20 | 0.01 µf |
| CAPACITOR | C21 | 0.01 µf |
| RESISTOR | R1 | 4.99M |
| RESISTOR | R4 | 49.9K |
| RESISTOR | R5 | 49.9K |
| RESISTOR | R16 | 10K |
| RESISTOR | R17 | 47.5K |
| RESISTOR | R18 | 2.57K |
| RESISTOR | R19 | 549 |
| RESISTOR | R20 | 5.11K |

Figure 10:
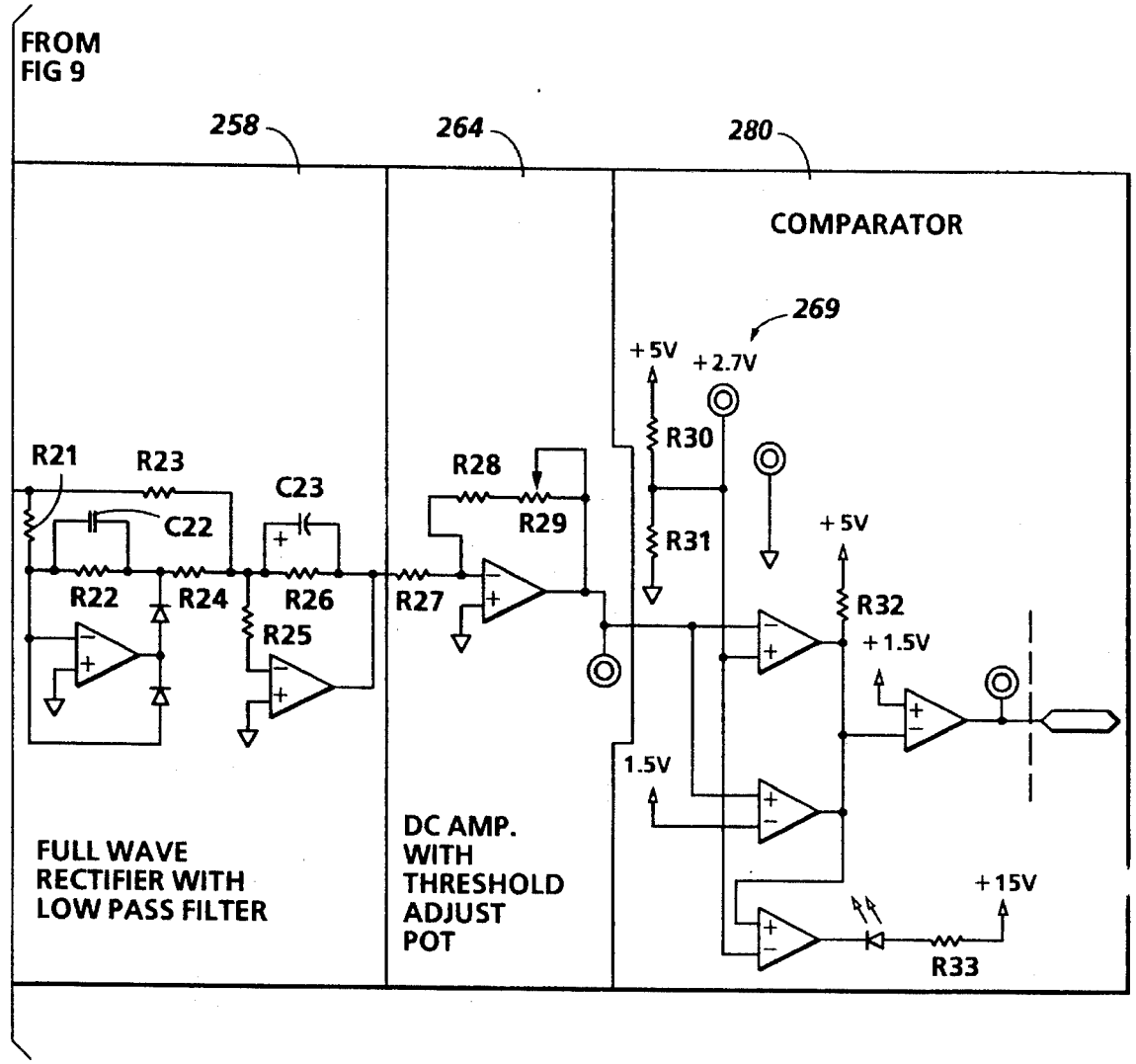
FIG. 10 is a circuit diagram of the rectifier, DC amplifier and comparator for the sense electrode for the capacitive sensor of FIG. 5.

FIG. 10 illustrates exemplary circuitry for full wave rectifier 258, d.c. amplifier 264, and comparator 280. A table of exemplary circuit component values for full wave rectifier 258, d.c. amplifier 264, and comparator 280 are as follows:

| ELEMENT NAME | ELEMENT NUMBER | ELEMENT VALUE |
| --- | --- | --- |
| CAPACITOR | C22 | 3 PF |
| CAPACITOR | C23 | 10.0 µf |
| RESISTOR | R21 | 20K |
| RESISTOR | R22 | 20K |
| RESISTOR | R23 | 20K |
| RESISTOR | R24 | 10K |
| RESISTOR | R25 | 1.0K |
| RESISTOR | R26 | 54.9K |
| RESISTOR | R27 | 3.83K |
| RESISTOR | R28 | 19.1K |
| RESISTOR | R29 | 20K |
| RESISTOR | R30 | 10K |
| RESISTOR | R31 | 12.1K |
| RESISTOR | R32 | 10K |
| RESISTOR | R33 | 2.2K |

Figure 8:
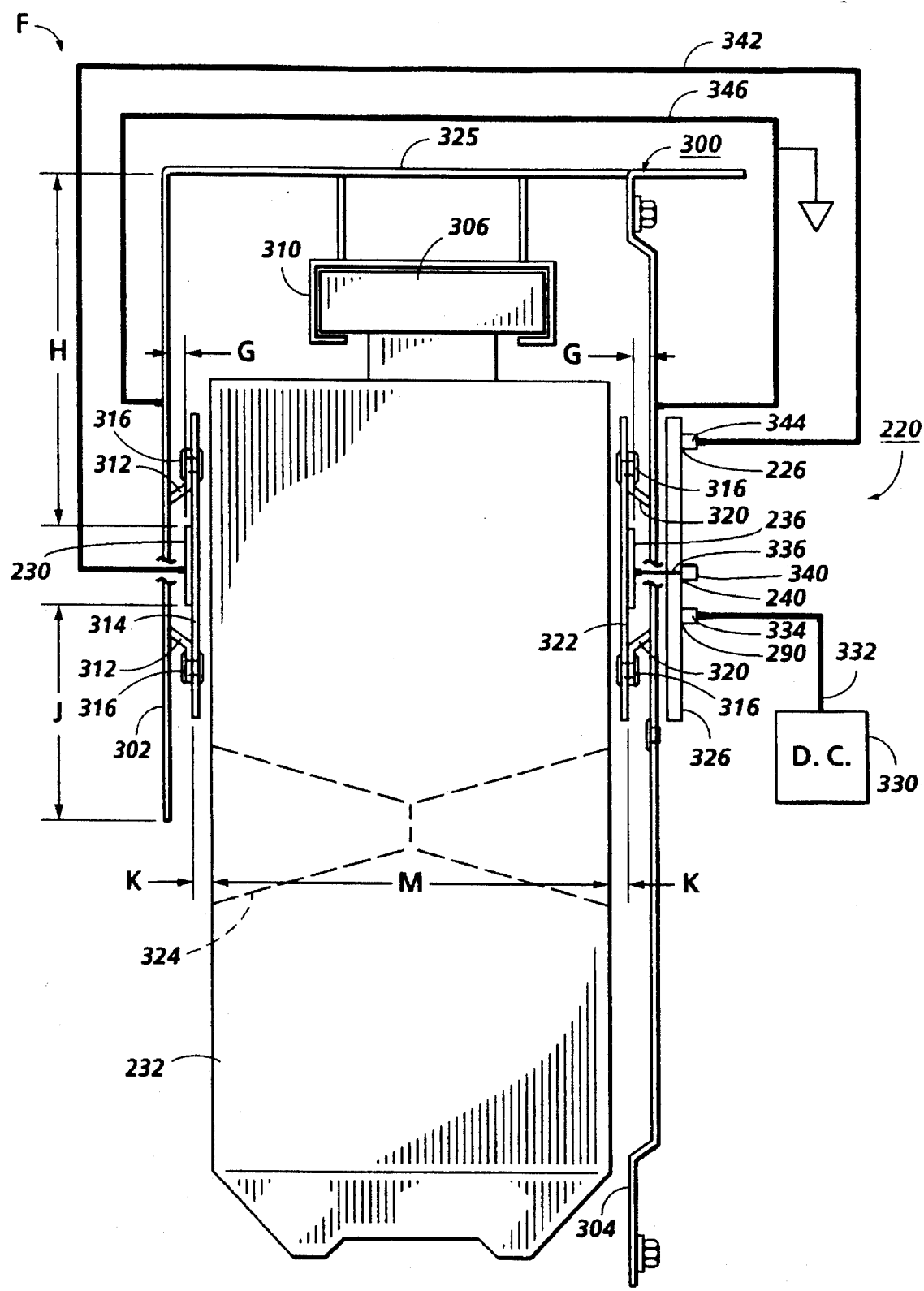
FIG. 8 is an elevational view of the toner container, signal electrode, and sense electrode for the capacitive sensor of FIG. 5.

The installation of sensor 220 around waste bottle 232 is shown generally in FIG. 8. Waste bottle 232 is typically located within the cleaning unit F and preferably between cleaning unit frame 300. The cleaning unit frame 300 is typically made of durable materials such as steel stampings and is preferably grounded. The waste bottle 232 is located between left and right frame members 302 and 304, respectively, of the frame 300. A lip 306 at the upper portion of the waste bottle 232 is supported by bracket 310 which is connected to the frame 300. The lip 306 of the bottle 232 slidably fits within the bracket 310 to properly align the bottle 232 within the frame 300.

A signal electrode bracket 312 is fixedly attached to the left frame member 302 by any suitable means such as welding. The bracket 312 may alternatively be a portion of left frame members 302. A signal electrode backing plate 314 is fixedly attached to the sensor bracket 312 by any suitable means such as rivets 316. The signal electrode backing plate 314 may be made of any suitable non-electrically conductive material such as an electrical circuit board. The signal electrode 230 is located against the signal electrode backing plate 314 between the backing plate 314 and the bracket 312. The signal electrode 230 may have any suitable shape, but applicants have found that a circular electrode with a diameter of approximately two inches is suitable for the practice of the invention. The signal electrode 230 is constructed of an electrically conductive material.

A sense electrode bracket 320 is fixedly attached to the right frame member 304. The bracket 320 may be a separate item or an integral part of right frame member 304. A sense electrode backing plate 322 is fixedly attached to the sense electrode bracket 320 by any suitable means such as rivets 316. Sense electrode 236 is located against the sense electrode backing plate 322 between the sense electrode backing plate 322 and the sense electrode bracket 320. The sense electrode 236 is preferably similar to the signal electrode 230 with a two inch diameter round shape. The sense electrode 236 is preferably constructed of an electrically conductive material. Frame vertical members 302 and 304 serve as frame back plates to make the electrodes 230 and 236, respectively, insensitive to objects behind the electrodes. Back plates 302 and 304 are therefore preferably electrically conductive.

Applicants have found that the positioning of the electrodes 230 and 236 relative to the waste bottle 232 as well as relative to the cleaning unit frame 300 is important. Applicants have found that the width M of waste toner bottle 232 is important and have found that the addition of reinforcing ribs 324 within the bottle 232 serves to stabilize the dimension M when the interior of the bottle 232 is subjected to a vacuum. Applicants have further found that the distance between the electrodes 230 and 236 and the bottle 232, generally referred to as dimension K is important. Increasing dimension K decreases the signal. Preferably, the dimension K should be zero, but such a dimension is impossible due to tolerances between the bottle 232 and the frame 300. Applicants have found that a dimension of 4.4 millimeters for K to be adequate.

Applicants have further found that the dimension between the electrodes 230 and 236 and the backplates 302 and 304, respectively, generally referred to as dimension G is important. Applicants have found that increasing dimension G increases the signal, but might make the signal less sensitive to the height of the toner in the bottle. Applicants have further found that a dimension G of 8.4 millimeters to be acceptable.

Applicants have further found that extending the frame back plates 302 and 304, respectively, below the electrodes 230 and 236, respectively, makes the sensor 220 less sensitive to conditions outside the electrodes 230 and 236. Applicants have found that a dimension from the bottom of electrodes 230 and 236 to the bottom of plates 302 and 304, respectively, generally referred to as dimension J, to be, preferably, 25.0 millimeters. Applicants have further found that the dimension between the top of the electrodes 230 and 236 to top member 325 of the frame 300, generally referred to as dimension H to be important to the operation of the sensor 220. Decreasing the dimension H decreases the signal. Applicants have found that a dimension of H of as little as 2.0 inches to be acceptable.

The circuitry of FIGS. 6, 7 and 9, may be combined onto a single electronic board 326. The circuit board 326 is preferably mounted along frame back plate 304 adjacent the sense electrode 322 to minimize unwanted signals. Circuit board 326 is connected to power source 330 by means of electrical conduit 332 at connector 334 to power supply circuit 290. The power source 330 is preferably a + 15 volt/−15 volt direct current source and may be provided by a transformer (not shown). Sense electrode 236 is electrically connected via conduit 336 at connector 340 to circuit protector circuit 240. Signal electrode 230 is connected via conduit 342 to circuit board 326 at connector 344 to ESD protection circuit 226. Backing plates 304 and 306 are preferably grounded to the frame 300 and to each other via electrical conduit 346. It should be appreciated that any other suitable method of grounding the plates 304 and 306 may be used.

Figure 12:
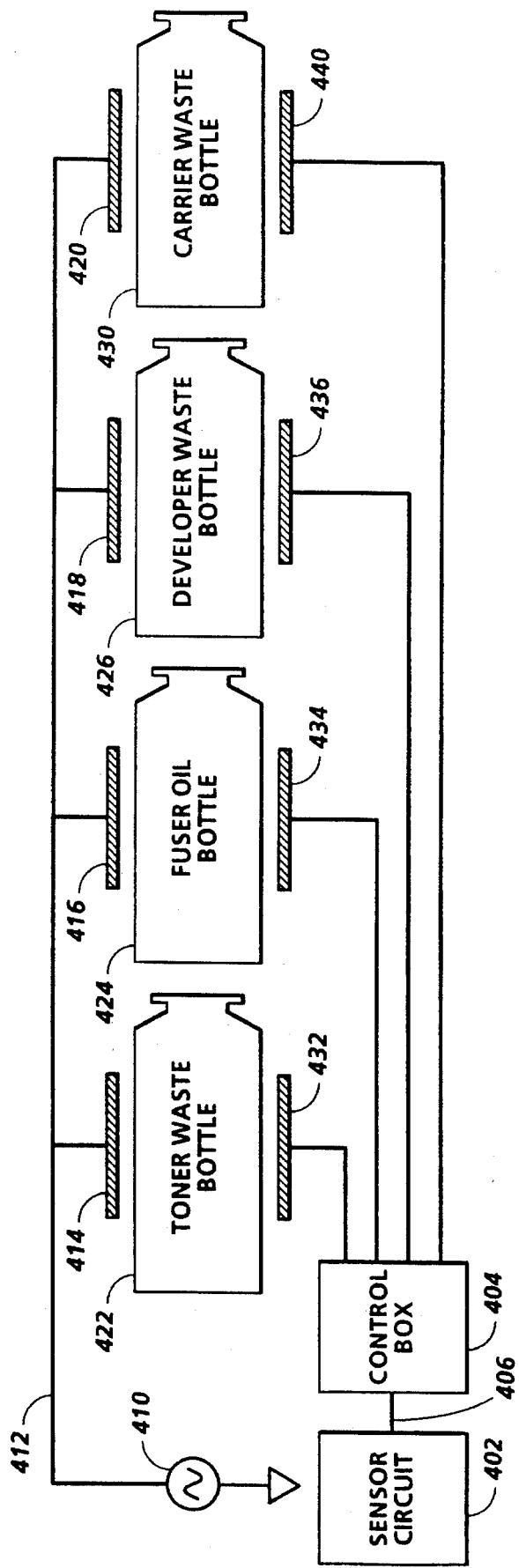
FIG. 12 is a circuit diagram of a control circuit to permit multiple containers to be monitored with the capacitive sensor of FIG. 5.

While circuit board 326, as shown in FIG. 8, may be utilized to measure toner waste bottle waste toner height, the circuit board 326 may equally be used to measure the height of the contents of any other electrically non-conductive container within the copying or printing machine. For example, referring to FIG. 12, sense circuit 402, having an electronic circuit similar to that of circuit board 326 of FIG. 8, may be electrically connected to a control box 404 via conduit 406. Power supply 410 is electrically connected by way of electrical conduit 412 to signal electrodes 412, 416, 418 and 420, respectively, for toner waste bottle 422, fuser oil bottle 424, developer waste bottle 426, and carrier waste bottle 430, respectively. Toner sense electrode 432, fuser oil bottle sense electrode 434, developer waste bottle sense electrode 436, and carrier waste bottle sense electrode 440 are electrically connected to the control box 404. Preferably, the line capacitance of the sense electrodes 432, 434, 436 and 440 should be approximately under 100 Pf and conduits 406 and 412 should be shielded cables. Control box 404 may selectively sense the signal from toner waste bottle 422, fuser oil bottle 424, developer waste bottle 426, or carrier waste bottle 430. The same sensor 402, therefore, may be used to measure the level in the toner waste bottle 422, fuser oil bottle 424, developer waste bottle 426, or the carrier waste bottle 430. Thus, the same sensor 402 may be used to measure the level of contents of any of a number of containers. This feature may provide a very inexpensive way to measure and control the level of contents in various containers of a machine.

While this invention has been described in conjunction with various embodiments, it is evident that many alternatives, modifications, and variations will be apparent to those skilled in the art. Accordingly, it is intended to embrace all such alternatives, modifications, and variations as fall within the spirit and broad scope of the appended claims.

What is claimed is:

1. An apparatus for detecting the level of material in a container, comprising:

a power source;

a first electrode, positioned adjacent the container, electrically connected to said power source;

a second electrode, spaced from said first electrode, positioned adjacent the container;

an electrical amplifier, electrically connected to the second electrode, for amplifying a current induced in said second electrode and for generating a voltage signal, said electrical amplifier maintaining said second electrode at a virtual ground to minimize environmental impedance effects;

a rectifier, electrically connected to said amplifier, for rectifying the voltage signal; and a comparator, electrically connected to said rectifier for comparing the voltage signal to a predetermined voltage signal corresponding to the container being full with material, said comparator including a fail safe circuit that, in response to the voltage signal from said rectifier being of a voltage less than a first preselected reference voltage and less than a second predetermined voltage, generates a signal that the container is full.

2. An apparatus according to claim 1, further comprising a protection circuit electrically connected between said power source and said first electrode, said protection circuit isolating said power source from electrostatic voltage discharges.

3. An apparatus according to claim 1, further comprising a protection circuit electrically connected between said second electrode and said amplifier, said protection circuit isolating said amplifier from electrostatic voltage discharges.

4. An apparatus according to claim 1, wherein said first electrode and said second electrode are positioned exterior to said container.

5. An apparatus according to claim 4, wherein said first electrode and said second electrode are opposed from one another.

6. An apparatus according to claim 1, wherein said second predetermined voltage is approximately 2.7 volts.

7. An apparatus according to claim 1, wherein said first predetermined voltage is approximately 1.5 volts.

8. An electrographic printing machine of the type having an apparatus for detecting the level of material in a container, said apparatus comprising:

a power source;

a first electrode, positioned adjacent the container, electrically connected to said power source;

a second electrode, spaced from said first electrode, positioned adjacent the container;

an electrical amplifier, electrically connected to the second electrode, for amplifying a current induced in said second electrode and for generating a voltage signal, said electrical amplifier maintaining said second electrode at a virtual ground to minimize environmental impedance effects;

a rectifier, electrically connected to said amplifier, for rectifying the voltage signal; and a comparator, electrically connected to said rectifier for comparing the voltage signal to a predetermined voltage signal corresponding to the container being full with material, said comparator including a fail safe circuit that, in response to the voltage signal from said rectifier being of a voltage less than a first preselected reference voltage and less than a second predetermined voltage, generates a signal that the container is full.

9. A printing machine according to claim 8, further comprising a protection circuit electrically connected between said power source and said first electrode, said protection circuit isolating said power source from electrostatic voltage discharges.

10. A printing machine according to claim 8, further comprising a protection circuit electrically connected between said second electrode and said amplifier, said protection circuit isolating said amplifier from electrostatic voltage discharges.

11. A printing machine according to claim 8, wherein said first electrode and said second electrode are positioned exterior to said container.

12. A printing machine according to claim 11, wherein said first electrode and said second electrode are opposed from one another.

13. A container of the type having an apparatus for detecting the level of material in the container, said apparatus adapted to be connected to a power source, said apparatus comprising:

a first electrode, positioned adjacent the container, electrically connected to said power source;

a second electrode, spaced from said first electrode, positioned adjacent the container;

an electrical amplifier, electrically connected to the second electrode, for amplifying a current induced in said second electrode and for generating a voltage signal, said electrical amplifier maintaining said second electrode at a virtual ground to minimize environmental impedance effects;

a rectifier, electrically connected to said amplifier, for rectifying the voltage signal; and a comparator, electrically connected to said rectifier for comparing the voltage signal to a predetermined voltage signal corresponding to the container being full with material, said comparator including a fail safe circuit that, in response to the voltage signal from said rectifier being of a voltage less than a first preselected reference voltage and less than a second predetermined voltage, generates a signal that the container is full.

14. A container according to claim 13, further comprising a protection circuit electrically connected between said power source and said first electrode, said protection circuit isolating said power source from electrostatic voltage discharges.

15. A container according to claim 13, further comprising a protection circuit electrically connected between said second electrode and said amplifier, said protection circuit isolating said amplifier from electrostatic voltage discharges.

16. A container according to claim 13, wherein said first electrode and said second electrode are positioned exterior to said container.

17. A container according to claim 16, wherein said first electrode and said second electrode are opposed from one another.

* * * * *